(No Model.)
W. H. THOMPSON.
CARRIAGE TOP JOINT.
No. 290,144.    Patented Dec. 11, 1883.
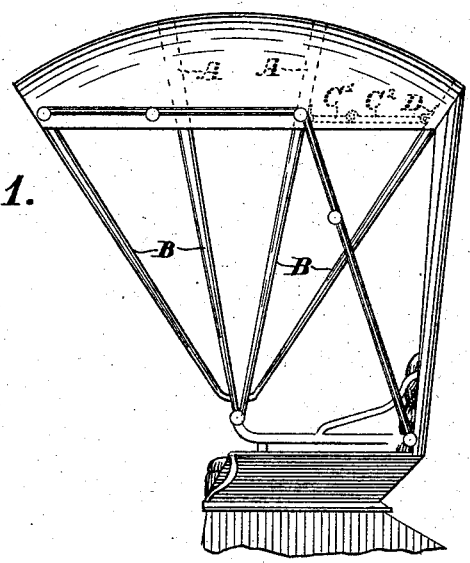
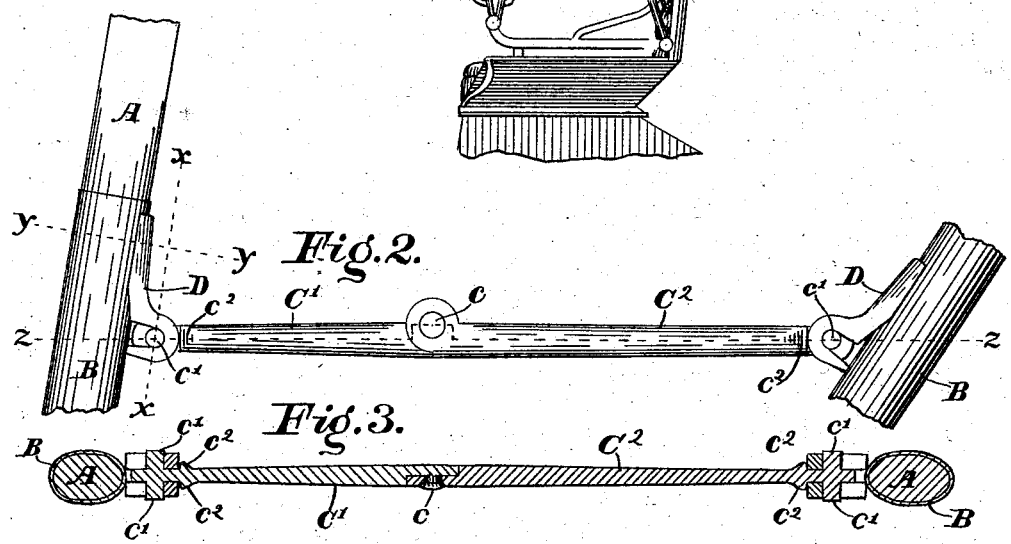
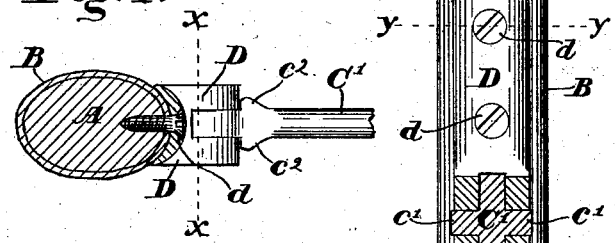
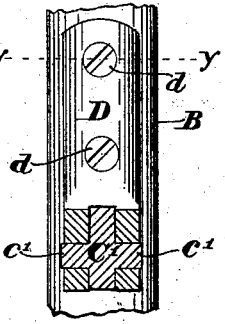
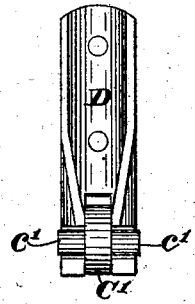
WITNESSES.
Chas. A. Leonard.
E. W. Bradford.
INVENTOR.
Wm. H. Thompson,
PER
C. Bradford,
ATTORNEY.

UNITED STATES PATENT OFFICE.

WILLIAM H. THOMPSON, OF INDIANAPOLIS, IND., ASSIGNOR OF ONE-HALF TO IRVING S. GORDON AND WILLIAM E. KURTZ, BOTH OF SAME PLACE.

CARRIAGE-TOP JOINT.

SPECIFICATION forming part of Letters Patent No. 290,144, dated December 11, 1883.

Application filed April 10, 1883. (No model.)

*To all whom it may concern:*

Be it known that I, WILLIAM H. THOMPSON, of the city of Indianapolis, county of Marion, and State of Indiana, have invented certain new and useful Improvements in Concealed Joints for Carriages, of which the following is a specification.

My said invention consists in an improved concealed prop-joint for carriages, which can be located between the bows or bow-sockets, thus economizing space.

Referring to the accompanying drawings, which are made a part hereof, and on which similar letters of reference indicate similar parts, Figure 1 is a side elevation of a carriage-top, the location of my improved joint being indicated by dotted lines; Fig. 2, a side elevation of the joint and the portions of the bows or bow-sockets upon which it is secured, on an enlarged scale; Fig. 3, a horizontal sectional view on the dotted line $z\ z$ of the portions shown in Fig. 2; Fig. 4, a detail sectional view, looking downward from the dotted line $y\ y$ in Fig. 2, on a still further enlarged scale; Fig. 5, a vertical sectional view on the dotted line $x\ x$, and Fig. 6 an end view of the device before applied to the bows.

In said drawings, the portions marked A represent the bows of the carriage-top; B, the bow-sockets; $C'\ C^2$, the parts of my improved prop-joint, and D the bearings therefor, by which it is secured in position.

The parts A and B are or may be of well-known forms, and need no special description.

The prop-joint is composed of two parts, $C'$ and $C^2$, as usual, said parts being secured together by a rivet, $c$, which is preferably cast upon one portion and enters a hole cast in the other, these parts being usually of malleable iron. Each part has upon its outer end four lugs or projections, two of which, $c'$, serve as pivots, which rest in the bearing D, and two of which, $c^2$, rest against the outside of said bearing, and prevent the joint part from coming in contact with the bow or bow-socket. These lugs or projections are also preferably cast upon the parts $C'\ C^2$, although they might be formed by drilling holes through said parts and inserting short pieces of wire or like material.

The bearings D are substantially double hooks, which are hooked around over the projections $c'$, between them and the projections $c^2$, and thus, when in position, hold the parts $C'\ C^2$ of the prop-joint from both inward and outward movement. Like said parts, these bearings are preferably formed of cast metal, and can be cast in the exact shape required without fitting. They are secured either to the bows or to the bow-sockets at or near the point where said bows and sockets join, usually by screws $d$.

My joint is intended to be used between the two rear bows of the carriage in the place where concealed joints have usually been placed. As it is adapted and intended to be placed directly between the bows and not upon the sides thereof, it occupies only the otherwise vacant space at that point, and does not cause the covering to bulge out, as has been done by joints heretofore used.

My whole device, being constructed exclusively of cast-metal parts cast in form to be put together with little or no fitting, is inexpensive to manufacture.

Having thus fully described my said invention, what I claim as new, and desire to secure by Letters Patent, is—

1. A prop-joint for carriages, consisting of two parts, each of which is provided with projections, $c'\ c^2$, and bearings therefor, adapted to be attached to the sides of the bows which face each other, substantially as set forth.

2. The combination of the bows and bow-sockets A B, the joint $C'\ C^2$, the parts of which are each provided with lugs $c'\ c^2$, and the bearings D, substantially as set forth.

3. The combination, with a carriage-top and a prop-joint therefor, of bearings D, adapted to hook over projections on the joint parts at one end and extending up and secured to the bows at the other, substantially as set forth.

In witness whereof I have hereunto set my hand and seal at Indianapolis, Indiana, this 13th day of February, A. D. 1883.

WILLIAM H. THOMPSON. [L. S.]

In presence of—
C. BRADFORD,
E. W. BRADFORD.